United States Patent
Beaudry et al.

(10) Patent No.: US 11,118,035 B2
(45) Date of Patent: Sep. 14, 2021

(54) HIGHLY FIRE-RESISTANT EXPANDED POLYMERIC MATERIAL

(71) Applicant: Armacell Enterprise GmbH & Co. KG, Schönefeld OT Waltersdorf (DE)

(72) Inventors: Jon Beaudry, Johnson City, TN (US); David Polito, Graham, NC (US); Kartik Patel, Haw River, NC (US)

(73) Assignee: ARMACELL ENTERPRISE GMBH & CO. KG, Schönefeld Ot Waltersdorf (DE)

( * ) Notice: Subject to any disclaimer, the term of this patent is extended or adjusted under 35 U.S.C. 154(b) by 44 days.

(21) Appl. No.: 16/246,684

(22) Filed: Jan. 14, 2019

(65) Prior Publication Data
US 2020/0224010 A1    Jul. 16, 2020

(51) Int. Cl.
| | |
|---|---|
| *C08L 9/02* | (2006.01) |
| *C08J 9/00* | (2006.01) |
| *C08J 3/24* | (2006.01) |
| *C08J 3/22* | (2006.01) |
| *C08J 9/10* | (2006.01) |
| *E04B 1/94* | (2006.01) |
| *E04B 1/90* | (2006.01) |

(52) U.S. Cl.
CPC ............... *C08L 9/02* (2013.01); *C08J 3/226* (2013.01); *C08J 3/24* (2013.01); *C08J 9/0038* (2013.01); *C08J 9/0061* (2013.01); *C08J 9/103* (2013.01); *C08J 2201/022* (2013.01); *C08J 2203/04* (2013.01); *C08J 2309/02* (2013.01); *C08J 2411/00* (2013.01); *C08J 2423/28* (2013.01); *C08J 2427/06* (2013.01); *C08J 2471/02* (2013.01); *C08J 2491/06* (2013.01); *C08L 2201/02* (2013.01); *C08L 2203/14* (2013.01); *C08L 2205/035* (2013.01); *C08L 2205/06* (2013.01); *C08L 2310/00* (2013.01); *C08L 2312/02* (2013.01); *E04B 1/90* (2013.01); *E04B 1/942* (2013.01)

(58) Field of Classification Search
CPC ... C08L 2201/02; C08L 23/16; C08K 5/0066; C08J 9/0061; C08J 9/16
See application file for complete search history.

(56) References Cited

U.S. PATENT DOCUMENTS

| | | | | |
|---|---|---|---|---|
| 2016/0137801 | A1* | 5/2016 | Zauner | C08J 9/0061 521/59 |
| 2017/0253716 | A1* | 9/2017 | Shimamoto | C08K 3/04 |
| 2018/0037751 | A1* | 2/2018 | Lu | C09D 5/18 |

FOREIGN PATENT DOCUMENTS

| | | |
|---|---|---|
| EP | 3006491 A1 | 4/2016 |
| EP | 3187548 A1 | 7/2017 |
| EP | 3372631 A1 | 9/2018 |
| EP | 3388477 A1 | 10/2018 |
| WO | 2013102208 A1 | 7/2013 |
| WO | 2018053395 A1 | 3/2018 |

OTHER PUBLICATIONS

Extended European Search Report dated Apr. 10, 2019 in EP Application No. 19151649.1.

* cited by examiner

*Primary Examiner* — Gregory Listvoyb
(74) *Attorney, Agent, or Firm* — Panitch Schwarze Belisario & Nadel LLP

(57) ABSTRACT

A highly fire-resistant expanded polymeric material for thermal insulation, acoustic insulation and/or fire barrier contains rubber, expandable graphite, at least one alkaline earth metal component selected from alkaline earth metal carbonates, alkaline earth metal hydroxides, hydrates of either, and combinations thereof, and a component containing silica or a silicate. The expanded polymeric material is preferably manufactured by a process including decomposition of a chemical blowing agent.

26 Claims, 2 Drawing Sheets

HIGHLY FIRE-RESISTANT EXPANDED POLYMERIC MATERIAL

BACKGROUND OF THE INVENTION

The present invention relates to a highly fire-resistant expanded polymeric material, a process of manufacturing such material, and the use of such a material.

Expanded, polymeric insulation materials comprise mainly two groups of materials, namely flexible elastomeric foams (FEFs) and polyethylene foams (PEFs).

Flexible elastomeric foams (FEFs) are flexible insulation materials with a high filler loading, achieved by a chemical expansion (foaming) process. Such materials are almost exclusively based on a narrow selection of polymer bases. The majority of such expanded materials are based upon NBR or NBR/PVC (e.g., products sold by the present applicant under the trademarks NH/Armaflex®, AF/Armaflex®, K-Flex® ST, Kaiflex® KK) and EPDM (e.g., products sold by the present applicant under the trademarks HT/Armaflex®, Aeroflex®). Expanded EPDM is mainly used for higher temperature insulation, e.g. solar applications, whereas NBR is the most widespread polymer base for standard FEFs, such as in heating and plumbing and ventilation and cooling applications.

There are several reasons for the domination of NBR: It is tolerant in blending with various fillers, polymers, plasticizers and additives. NBR can e.g. be blended with PVC, having a positive impact on the expansion process by melting and therefore allowing the production of low density materials (<50 kg/m$^3$) in a chemical expansion process in spite of high filler loadings. Furthermore, such materials show good mechanical properties as well as physical and chemical stability at very economic costs. Moreover, NBR and NBR/PVC can be blended with high levels of fillers and flame retardants to achieve a high level of flame resistance.

The second group of insulation materials, called polyethylene foams (PEFs), is made by physical expansion (foaming), using physical blowing agents. Such materials comprise a very low level of fillers on account of the fact that fillers lead to an overnucleation and therefore collapse of the material. Due to the limited possibilities of loading such materials with fillers, plasticizers, etc., the possibilities of modifying their properties are very limited. Therefore, the flexibility of PEFs in comparison to FEFs is worse, leading to disadvantages, e.g. due to a significantly higher amount of cuttings during installation, which is a drawback in terms of installation time and costs. In addition, the adhesion of PE (polyethylene) is in general difficult, leading again to some drawbacks in comparison to FEFs.

Expandable graphite has recently attracted increasing attention as a sustainable material for imparting fire resistance to polymeric materials (see for example International patent publications WO 2017/083345, WO 2017/117013 and WO 2017/218547). Other fillers for expanded polymeric materials are described, for example, in *Polymer Degradation and Stability*, 96(8), pages 1462-1469 (2011), and in European patent publications EP 1 883 664, EP 1 831 012 and EP 1 400 547.

BRIEF SUMMARY OF THE INVENTION

The present invention has been made in view of the problems of the prior art. It is thus an object of the present invention to provide a versatile, highly flame retardant, low smoke generating material that can be modified in a wide range by using fillers, additives, plasticizers, etc. A further target is to have a low thermal conductivity and low Water Vapor Transmission value as well as high temperature resistance and easy applicability. Additionally, the material should have good resistance against UV, aging, weathering and chemicals. Furthermore, it should be processable using standard methods of the rubber industry.

The present inventors have surprisingly found that this objective may be achieved by an expanded polymeric material, which consists of at least 300 phr, but less than 1200 phr, ingredients in total by mass, the expanded polymeric material comprising rubber, expandable graphite, at least one alkaline earth metal carbonate, alkaline earth metal hydroxide and/or a hydrate of either, or a combination thereof (sometimes referred to herein as "at least one alkaline earth metal component" for short), and a component containing silica or silicate.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
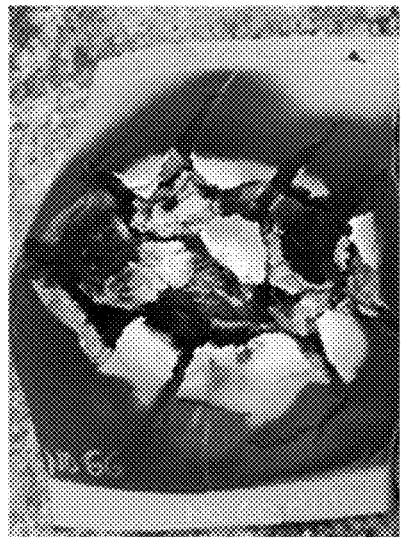
FIGS. 1A through 1E are photographs of the foams of Examples (A) to (E) that were evaluated with respect to flame spread resistance, fire penetration resistance and char integrity, described below in the Examples section of the present application.
Figure 1B:
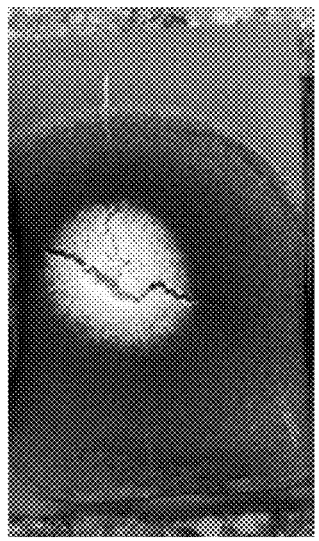
Figure 1C:
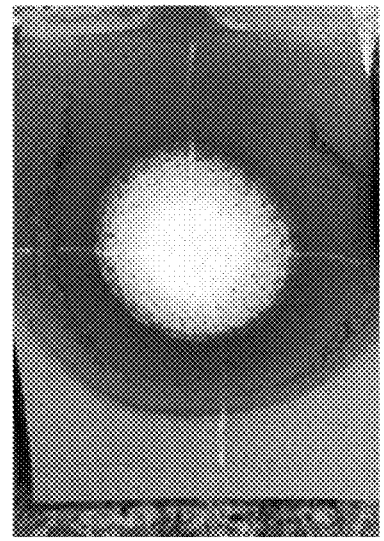
Figure 1D:
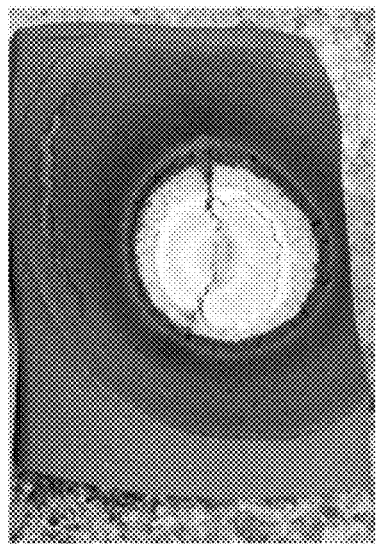
Figure 1E:
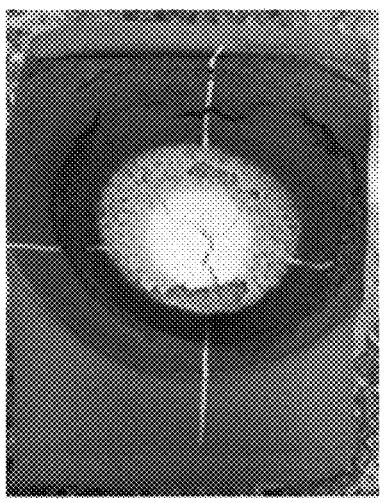

As used herein, the amounts specified in the unit "phr" refer to amounts relative to 100 parts by mass of rubber. The term "elastomer" may be used instead of the term "rubber." Rubbers are predominantly amorphous polymers with a glass transition temperature below room temperature. As defined by IUPAC, the term "elastomer" refers to any polymer that displays rubber-like elasticity. Rubbers are typically polymers that are cross-linkable by any crosslinking systems known in the field, in particular by sulfur-based crosslinking systems or peroxide-based crosslinking systems. Specific examples of rubbers include natural rubber (NR), acrylonitrile butadiene rubber (NBR), chloroprene rubber (CR), ethylene propylene diene monomer rubber (EPDM), butadiene rubber (BR), chlorosulfonated polyethylene rubber (CSM), and Silicone Rubber (MQ) or any combination thereof. Preferably, the unit "phr" is relative to the total amount of natural rubber (NR), acrylonitrile butadiene rubber (NBR), chloroprene rubber (CR), ethylene propylene diene monomer rubber (EPDM), butadiene rubber (BR), chlorosulfonated polyethylene rubber (CSM), and Silicone Rubber (MQ) in the expanded polymeric material.

Commercial sources for acrylonitrile butadiene rubber include LG Chemicals, Zeon Elastomers, Kumho Petroleum Chemcials, Nantex and Dynasol, while polychloroprene rubber may be obtained, e.g., from Dupont/DOW, Arlanxeo, Denka and Tosoh.

Expandable Graphite

Expandable graphite may also be referred to as expandable flake graphite, intumescent flake graphite, or expandable flake; and, for the purposes herein, these terms may be used interchangeably. Methods of preparation of expandable graphite are disclosed in WO 2017/218547, which is hereby incorporated by reference in its entirety, in particular paragraphs [0081] to [0094] thereof.

The term expandable graphite typically includes intercalated graphite in which an intercalant material is included between the graphite layers of graphite crystal or particle. Examples of intercalant materials include halogens, alkali metals, sulfates, nitrates, various organic acids, aluminum chlorides, ferric chlorides, other metal halides, arsenic sulfides, and thallium sulfides. The expandable graphite preferably includes non-halogenated intercalant materials. In certain embodiments, the expandable graphite includes sulfate intercalants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.), Expandable Graphite Grades 1721 (Asbury Carbons, Asbury, N.J.) and GrafGuard 180-60N, 200-100N, 210-140N, and 250-50N (NeoGraf Solutions, Lakewood, Ohio). Other commercial grades contemplated as useful in the present invention include 1722, 3393, 3577, 3626, and 1722HT (Asbury Carbons, Asbury, N.J.).

The expandable graphite may be characterized as having a mean or average size, expressed as the $D_{50}$, in the range from about 30 μm to about 1.5 mm, in other embodiments from about 50 μm to about 1.0 mm, and in other embodiments from about 180 to about 850 μm. In certain embodiments, the expandable graphite may be characterized as having a mean or average size of at least 30 μm, in other embodiments at least 44 μm, in other embodiments at least 180 μm, and in other embodiments at least 300 μm. In one or more embodiments, expandable graphite may be characterized as having a mean or average size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments, the expandable graphite may be characterized as having a carbon content in the range from about 70% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon. In one or more embodiments, the expandable graphite may be characterized as having a sulfur content in the range from about 0% to about 8%, in other embodiments from about 0.01% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 0.01%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 8. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 8, in other embodiments at most 6.5, in other embodiments at most 6, and in other embodiments at most 5.

The expandable graphite preferably has a temperature of activation in the range of 180° C. to 300° C., preferably in the range of 190° C. to 260° C., more preferably in the range of 200° C. to 220° C. The temperature of activation may be interchangeably referred to as the onset temperature or expansion temperature and typically refers to the temperature at which expansion of the graphite starts.

Inorganic Fillers

The expanded polymeric material of the present invention contains inorganic fillers including at least one alkaline earth metal component selected from alkaline earth metal carbonates, alkaline earth metal hydroxides, hydrates of either, and combinations thereof, as well as a component containing silica or silicate. Other inorganic fillers may be included in the expanded polymeric material of the present invention without limitation.

The at least one alkaline earth metal carbonate, alkaline earth metal hydroxide and/or a hydrate of either is not particularly limited and may refer to any compound or mixture of compounds containing at least one alkaline earth metal ion, at least one hydrogen carbonate or carbonate ion and at least one hydroxyl group or water molecule.

The at least one alkaline earth metal carbonate, alkaline earth metal hydroxide and/or a hydrate of either, or a combination thereof is typically capable of liberating water and carbon dioxide at varying temperatures. Water liberation typically occurs as temperatures of 170° C. to 270° C., preferably 200 to 250° C., more preferably 210 to 230° C. (preferably referring to the temperature at which the rate of water coming off the material is highest, when raising the temperature at a rate of 10° C./min starting from 100° C.).

Carbon dioxide liberation typically occurs at temperatures of 280° C. to 380° C., preferably 310 to 360° C., more preferably 320 to 340° C. (preferably referring to the temperature at which the rate of carbon dioxide coming off the material is highest, when raising the temperature at a rate of 10° C./min starting from 200° C.).

At temperatures of about 560° C. the at least one alkaline earth metal carbonate, alkaline earth metal hydroxide and/or a hydrate of either, or a combination thereof is typically capable of forming a stable, cement-like material which hinders further decomposition of the underlying polymeric material and inhibits the spreading of fire by burning droplets of polymeric material.

The at least one alkaline earth metal carbonate, alkaline earth metal hydroxide and/or a hydrate of either preferably includes at least a carbonate and a hydrate or hydroxide. It is to be understood that the carbonate may be present in the same or different compound as the hydrate or hydroxide. Furthermore, it is to be understood that the hydrate may be a monohydrate or contain more than one mole water per mole, such as a dihydrate, a trihydrate, a tetrahydrate, a pentahydrate, hexahydrate, heptahydrate, octahydrate, nonahydrate, decahydrate, etc. It is also to be understood that, when referring to a carbonate of an alkaline earth metal, this does not exclude the possibility that the alkaline earth metal carbonate may be hydrated and/or contain one or more hydroxy groups.

The at least one alkaline earth metal carbonate, alkaline earth metal hydroxide and/or a hydrate of either preferably contains at least one component that may liberate water and $CO_2$ at elevated temperatures, or at least one component that may liberate water and at least one component that may liberate $CO_2$ at elevated temperatures.

More preferably, the at least one alkaline earth metal carbonate, alkaline earth metal hydroxide and/or a hydrate of either comprises:

a) at least one alkaline earth metal compound that is both a carbonate and either a hydroxide or hydrate, b) at least one alkaline earth metal carbonate and at least one alkaline earth metal hydroxide or hydrate, or c) any combination thereof.

In other words, the at least one alkaline earth metal carbonate, alkaline earth metal hydroxide and/or a hydrate of either preferably comprises one alkaline earth metal compound containing both $CO_3^{2-}$ and water (or $CO_3^{2-}$ and hydroxide). An example of such a compound is hydromagnesite. Alternatively, the at least one alkaline earth metal carbonate, alkaline earth metal hydroxide and/or a hydrate of either preferably comprises one compound that is an alkaline earth metal compound containing $CO_3^{2-}$ (and optionally water and/or hydroxide) and a further compound that is an alkaline earth metal compound containing water (and optionally $CO_3^{2-}$ and/or hydroxide). An example thereof is a combination of magnesium carbonate with a magnesium sulfate hydrate. The water is preferably present in the form of crystal water.

Examples of the at least one alkaline earth metal carbonate, alkaline earth metal hydroxide and/or a hydrate of either include, but are not limited to:

carbonates such as magnesium carbonate ($MgCO_3$), calcium carbonate ($CaCO_3$), strontium carbonate ($SrCO_3$) and barium carbonate ($BaCO_3$);

hydroxides such as magnesium hydroxide ($Mg(OH)_2$), calcium hydroxide ($Ca(OH)_2$), strontium hydroxide ($Sr(OH)_2$) and barium hydroxide ($Ba(OH)_2$);

any mixture of these carbonates and hydroxides, as well as any hydrates of these carbonates, hydroxides and/or mixtures of carbonates and hydroxides.

Specific examples of the at least one alkaline earth metal carbonate, alkaline earth metal hydroxide and/or a hydrate of either include hydrated magnesium carbonate such as magnesium carbonate monohydrate (CAS No. 13717-00-5), magnesium carbonate dihydrate (CAS No. 5145-48-2), magnesium carbonate trihydrate (CAS No. 14457-83-1), magnesium carbonate pentahydrate (CAS No. 61042-72-6), or any combination thereof. Naturally occurring di, tri, and pentahydrates of magnesium carbonate are known as barringtonite ($MgCO_3 * 2 H_2O$), nesquehonite ($MgCO_3 * 3 H_2O$), and lansfordite ($MgCO_3 * 5H_2O$), respectively. Mixed forms of magnesium carbonate and magnesium hydroxide include artinite ($MgCO_3.Mg(OH)_2.3\ H_2O$), hydromagnesite (4 $MgCO_3.Mg(OH)_2.4\ H_2O$), and dypingite (4 $MgCO_3.Mg(OH)_2.5\ H_2O$).

Specific examples of the at least one alkaline earth metal carbonate, alkaline earth metal hydroxide and/or a hydrate of either include calcium carbonate (CAS No. 471-34-1) and hydrates thereof. Naturally occurring calcium carbonate forms are known as aragonite, calcite, chalk and limestone. Naturally occurring calcium carbonate hydrates include monohydrocalcite ($CaCO_3.H_2O$) and ikaite ($CaCO_3.6\ H_2O$).

Mixed forms containing both magnesium and calcium include calcium magnesium carbonates such as dolomite (typically having formula $CaMg(CO_3)_2$) and huntite (typically $Mg_3Ca(CO_3)_4$).

Preferred examples of the at least one alkaline earth metal carbonate, alkaline earth metal hydroxide and/or a hydrate of either include mixtures of huntite and hydromagnesite, such as are available under the trademarks Ultracarb (L K Minerals), C-TEC MC9 (R J Marshall) or Securoc (Sibelco Specialty Minerals). Ultracarb is preferably used in the present invention.

Basic magnesium carbonate based flame retardants can also be found in *Polymer Engineering & Science,* 32(5), pages 327-334 (1992), as well as in *Fire and Materials,* 31(6), pages 387-410 (2007).

Any mixture of the at least one alkaline earth metal carbonate, alkaline earth metal hydroxide and/or a hydrate may be used.

The Component Containing Silica or Silicate

The component containing silica or silicate is not particularly limited and refers to any compound containing (or consisting of) silica and/or a silicate. It is to be understood that the "component containing silica or silicate" may contain one or more silica containing compounds or one or more silicate containing compounds or any combination thereof. It is preferred that the "component containing silica or silicate" essentially consists of silica or silicates or a combination thereof. In particular, it is preferred that the "component containing silica or silicate" contains 25 to 100% by weight of $SiO_2$, as determined by elemental analysis using Atomic Absorption Spectroscopy (AAS). Another method suitable for elemental analysis is Proton Induced X-Ray Emission (PIXIE).

Silica may be used, e.g., in the form of quartz, tridymite, cristobalite, coesite, stishovite, moganite, chalcedony, precipitated silica or fumed silica.

Silicates can be categorized according to their structure as nesosilicates (such as olivine), sorosilicates (such as epidote and melilite), cyclosilicates (such as tourmaline), inosilicates (such as pyroxene and amphibole), phyllosilicates (such as micas and clays), tectosilicates (such as quartz, feldspars and zeolites). For use in the present invention, phyllosilicates (typically sheet-like structure) and tectosilicates (typically 3D-framework type structure) are preferred. More preferred are phyllosilicates.

Phyllosilicates include any minerals listed in the Nickel-Strunz classification as 09.E. These are preferably selected from serpentines (such as antigorite, chrysotile and lizardite), clays (such as halloysite, kaolinite, illite, montmorillonite, vermiculite, talc, sepiolite, palygorskite and pyrophyllite), micas (such as biotite, fuchsite, muscovite, phlogopite, lepidolite, margarite and glauconite) and chlorites.

Tectosilicates include any minerals listed in the Nickel-Strunz classification as 09.F, 09.G and 04.DA. These are preferably selected from feldspars (including alkali feldspars and plagioclase feldspars) (such as microcline, orthoclase, anorthoclase, sanidine, albite, oligoclase, andesine, labradorite, bytownite and anorthite), feldspathoids (such as nosean, cancrinite, leucite, nepheline, sodalite, hauyne and lazurite), petalites, scapolites (such as marialite and meionite), analcimes, and zeolites (such as natrolite, erionite, chabazite, heulandite, stilbite, scolecite and mordenite).

Specific preferred examples of the component containing silica or silicate are selected from silica, fly ash, feldspar, diatomaceous earth, mica, vermiculite, clay, zeolite, talc, kaolin, palygorskite, cheto, hectorite, montmorillonite, barasym, ripidolite, smectite, Illite, nontronite, corrensite, saponite, sepiolite and beidellite.

It is to be understood that the component containing silica or silicate is not limited to the above examples and furthermore encompasses any compounds obtained from such minerals.

More preferably, the component containing silica or silicate comprises clay or consists of clay. Clay generally refers to hydrous aluminum phyllosilicate. A preferred group of clay is kaolin clay. Typical kaolin clays include the minerals kaolinite, dickite, halloysite, and nacrite which are polymorphs of $Al_2Si_2O_5(OH)_4$. Other types of clay include smectite clays, illite clays and chlorite clays.

In the present invention, the presence of the component containing silica or silicate, such as clay, is beneficial as it provides silica to the char process and is fire resistant itself. Thus, any type or combination of types of the component containing silica or silicate, such as clay, may be used and leads to beneficial interaction between the component containing silica or silicate and the at least one alkaline earth metal component.

Preferably, the component containing silica or silicate contains at least 50 wt.-% of kaolin clay, more preferably 70 wt.-% of kaolin clay, even more preferably 90 wt.-% of kaolin clay, based on the total weight of clay.

Rubber

As mentioned above, the rubber may be selected from a wide range of rubbers known to the skilled person. Preferably 80 wt.-%, more preferably 90 wt.-% or even 100 wt.-% of the rubber component consists of natural rubber (NR), acrylonitrile butadiene rubber (NBR), chloroprene rubber (CR), ethylene propylene diene monomer rubber (EPDM), butadiene rubber (BR), chlorosulfonated polyethylene rubber (CSM), and silicone rubber (MQ) or any combination thereof. More preferably 80 wt.-%, more preferably 90 wt.-% or even 100 wt.-% of the rubber component consists of acrylonitrile butadiene rubber (NBR) and/or chloroprene rubber (CR).

In order to achieve the effects of the present invention, it is preferred that the expanded polymeric material comprises acrylonitrile butadiene rubber and/or polychloroprene rubber. More preferably, the 100 phr of rubber comprise 10 to 95 phr of acrylonitrile butadiene rubber, 0 to 60 phr polychloroprene rubber and 0 to 90 phr of other rubbers. Even more preferably, the 100 phr of rubber comprise 30 to 80 phr of acrylonitrile butadiene rubber, 20 to 50 phr polychloroprene rubber and 0 to 25 phr of other rubbers. Even more preferably, the 100 phr of rubber comprise 60 to 70 phr of acrylonitrile butadiene rubber, 30 to 40 phr polychloroprene rubber and 0 to 10 phr of other rubbers. The other rubbers are preferably selected from natural rubber (NR), ethylene propylene diene monomer rubber (EPDM), butadiene rubber (BR), chlorosulfonated polyethylene rubber (CSM), and silicone rubber (MQ) or any combination thereof.

Polymers other than Rubber

The expanded polymeric material of the present invention may further contain polymers other than rubber. The polymers other than rubber may, e.g., be selected from epoxy resins, acrylic resins, urethane resins, silicone resins, polysiloxanes, cyanate ester resins, phenol resins, bismaleimide resins, polycarbonate resins, polyolefin resins, olefin-maleimide resins, cyclic olefin resins, polyester resins, polysulfone resins, polyether sulfone resins, polyphenylene sulfide resins, poly ether resins, polyoxyethylene benzyl polyphenylene resins, polyphenylene ether resins, polyether ether ketone resins, polyether ketone ketone resins, polyether imide resins, a polyamide resins, polyimide resins, polyimide amide resins, polyarylate resins, polyvinyl acetal resins, polyvinylchloride resins, polystyrene resins, fluorine resins or any combination of two or more thereof.

As the polyolefin resin, for example, polyethylene (PE), chlorinated polyethylene (CPE), high density polyethylene (HDPE), medium density polyethylene (MDPE), low density polyethylene (LDPE), linear low density polyethylene (LLDPE), very low density polyethylene (VLDPE), ultra-high molecular weight polyethylene (UHMWPE), polypropylene (PP), poly (4-methyl-1-pentene) may be used. In the preparation of polyolefins, one or more selected from ethylene, propylene, 1-butene, 1-pentene, 3-methyl-1-butene, 1-hexene, 3-methyl-1-pentene, 4-methyl-1-pentene, 1-octene, 1-decene, 1-dodecene, 1-tetradecene, 1-octadecene are typically used as monomers.

The cyclic olefin resin may, for example, be a ring-opening polymer of a monomer having norbornene structure, a ring-opening polymer of a monomer with other monomers having a norbornene structure, with the monomers having a norbornene structure addition polymer, an addition polymer of a monomer with other monomers having a norbornene structure, as well as hydrides of these ring-opened polymer or addition polymers.

Examples of the polyamide resin include polyamide 6, polyamide 66, polyamide 46, polyamides 4T, polyamide 6T, polyamide 6I, polyamide 9T, polyamide 10T and polyamide M5T.

Examples of polyesters include polyethylene terephthalate (PET), polytrimethylene terephthalate (PTT), polybutylene terephthalate (PBT) and polyethylene naphthalate (PEN), polybutylene naphthalate (PBN).

Examples of the epoxy resin include bisphenol A type epoxy resin, bisphenol F type epoxy resin, bisphenol S type epoxy resin, linear aliphatic epoxy resins, alicyclic epoxy resins, phenol novolak type epoxy resin, cresol novolak type epoxy resins, epoxidized polybutadiene, glycidyl ester epoxy resins, glycidyl amine type epoxy resins, salicylaldehyde type epoxy resin and biphenyl type epoxy resins.

For example, the expanded polymeric material may further comprise polyvinylchloride in an amount of 5 to 120 phr, preferably 10 to 100 phr, more preferably 20 to 80 phr, even more preferably 25 to 70 phr, still more preferably 30 to 55 phr, still more preferably 30 to 50 phr, still more preferably 35 to 45 phr.

The expanded polymeric material may also comprise chlorinated polyethylene in an amount of 5 to 120 phr, preferably 5 to 100 phr, more preferably 10 to 80 phr, even more preferably 10 to 60 phr, still more preferably 15 to 50 phr, still more preferably 15 to 40 phr, still more preferably 20 to 30 phr. The chlorinated polyethylene preferably exhibits a chlorination degree of 34% to 44% by weight.

Preferably, the total amount of polymers other than rubber is 5 to 240 phr, preferably 10 to 200 phr, more preferably 20 to 160 phr, even more preferably 25 to 120 phr, still more preferably 30 to 105 phr, still more preferably 40 to 90 phr, still more preferably 55 to 75 phr.

Other Components

The expanded polymeric material may further comprise one or more plasticizers in a total amount of 5 to 100 phr, preferably 5 to 80 phr, more preferably 10 to 60 phr, even more preferably 15 to 30 phr, still more preferably 15 to 25 phr. The plasticizers should have a positive impact on the fire retardancy. Therefore, preferred plasticizers are phosphate plasticizers or halogen containing plasticizers or any mixture thereof. The halogen containing plasticizers are preferably chlorinated paraffins and/or chlorinated fatty acid substituted glycerines and/or chlorinated alpha-olefins (especially preferred are long chain chlorinated plasticizers of C>17) having a chlorine content of at least 20 wt %, preferably at least 40 wt %, especially preferred at least 60 wt % according to DIN 53474. Such highly chlorinated, long chain materials have the greatest fire retardant impact and are—in contrast to short or medium chain chlorinated plasticizers—not persistent, bio-accumulative or toxic. Furthermore, such plasticizers have less negative impact on smoke development in comparison to brominated flame retardants. The phosphate plasticizers can be aliphatic, chloroaliphatic or aromatic phosphoric acid esters or any combinations thereof. Preferred are phosphoric acid esters of high phosphorous content and low smoke development, especially preferred are diphenyl 2-ethylhexyl phosphate (DPO), octyl diphenyl phospahate (Santicizer 141), isodecyl diphenyl Phospahate (Santicizer 148) and/or tributoxy ethyl phosphate (TBEP) due to their marginal smoke emission, low viscosity and low temperature resistance. Commercial sources of tributoxy ethyl phosphate include SMC Special Materials Company, HB Chemical and Cameo Chemicals.

The claimed material may comprise at least one synergist for the halogenated flame retardants and/or halogen containing plasticizers/polymers, e.g. antimony trioxide, zinc stannate, zinc hydroxystannate, 2,3-Dimethyl-2,3-diphenylbutane, bismuth oxychloride etc. Preferred are bismuth (Bi) and/or zinc (Zn) based materials, especially preferred are zinc stannate and bismuth oxychloride. A synergist increases the effectivity of the flame retardants in the reaction to fire in terms of smoke suppression and/or heat release. Depending on the grade of the desired fire retardancy only combinations of a synergist and conventional fire retardants can achieve the desired results.

The claimed material furthermore may comprise a heat and/or reversion stabilizer system. The stabilizers can be chosen from the classes of carbon blacks (which is typically different from expandable graphite), metal oxides (e.g. iron oxide) and hydroxides (other than the alkaline earth metal hydroxides of the alkaline earth metal component), metal organic complexes, radical scavengers (e.g. tocopherol derivatives), and combinations thereof.

The claimed material may further comprise flame retardants (preferably polymeric flame retardants) and synergists, biocides, plasticizers, stabilizers (e.g. versus UV, ozone, reversion etc.), colours etc., of any kind in any ratio, including additives for improving its manufacturing, application, aspect and performance properties, such as inhibitors, retarders, accelerators, etc.; and/or additives for adapting it to the application needs, such as char-forming and/or intumescent additives to render the material self-intumescent in case of fire, e.g. for general protection purposes and/or to close and protect e.g. wall and bulkhead penetrations; and/or substances that will lead to a self-ceramifying effect to pipes, wall penetrations etc. in case of fire, such as boron compounds, silicon containing compounds etc.; and/or internal adhesion promoters to ensure self-adhesive properties in co-extrusion and co-lamination applications, such as silicate esters, functional silanes, polyols, etc.

It is preferred that the expanded polymeric material contains less than 100 phr aluminum trihydroxide, more preferably less than 50 phr aluminum trihydroxide, even more preferably less than 20 phr aluminum trihydroxide, still more preferably less than 10 phr aluminum trihydroxide, still more preferably less than 5 phr aluminum trihydroxide.

Components used in the Preparation of the Expanded Polymeric Material

In the preparation of the expanded polymeric material additional components such as crosslinking agents and chemical blowing agents may be used. The crosslinking agents and chemical blowing agents are typically at least partially consumed during the expansion of the polymeric material. They are therefore not, or only to a limited amount, still present in the expanded polymeric material. Consequently, crosslinking agents and chemical blowing agents are not explicitly listed as components of the expanded polymeric material of the present invention. It is, however, to be understood that these components as well as their reaction products may be present in the expanded polymeric material according to the present invention. Furthermore, as crosslinking agents may be used in the preparation of the expanded polymeric material, it is to be understood that the components of the expanded polymeric material as set out above may be at least partially crosslinked. The cross-links may be between materials of the same type, such as between rubber molecules, or between materials of different types, such as between rubber molecules and polymers other than rubber.

At least one crosslinking system such as peroxides, triallylcyanurate, triallylisocyanurate, phenylmaleimide, thiadiazoles, fatty acid amide, hydrosilylation agents, radiation activators (for radiation or UV curing), sulphur systems, bisphenolics, metal oxides, etc. may be used to crosslink the expanded polymeric material. Preferred are substances that thermally decompose to liberate a radical, especially preferred are peroxides (including TAC/TAIC), thiadiazoles (including fatty acid amide), metal oxides and—in case of polymer blends comprising unsaturated polymers—sulphur systems. The choice of the curing system is affected by the presence and/or amount of unsaturated bonds in the polymer blends backbone. Polymer blends with saturated polymer main chains can only be cured with peroxides and—in case of halogenated polymers like CPE or CSM—with thiadiazol curing systems as well. Also, peroxide and thiadiazol cured materials are preferred because they show higher temperature and UV stability than sulfur cured materials. C—C and C—O bonds that are created during peroxide and/or thiadiazol vulcanisation are more resistant to high temperatures and UV irradiation than the C—S bonds of a sulfur vulcanisation.

Furthermore, at least one chemical blowing agent (e.g. releasing carbon dioxide, nitrogen, oxygen or water) chosen from the classes of organic blowing agents and/or inorganic blowing agents may be used in the preparation of the expanded polymeric material. Preferred are organic blowing agents of nitroso type, azo type and/or aromatic hydrazide type, especially preferred are azo type blowing agents like azodicarbonamide. Commercial sources of azodicarbonamide include Dong Jin (Korea), Kumyang (Korea), HPL (India) and Sopo (China).

All of the aforementioned ingredients show easy mixing and good dispersion in a wide range of dosage.

Preparation of the Expanded Polymeric Material

The preparation of the expanded polymeric material may be conducted according to commonly known methods of preparation, provided that the materials as specified herein are used.

The following is an example of a specific method of preparation. It is, however, to be understood that the present invention is not limited to this method.

In a first step, all materials except for the crosslinking agent are mixed by standard methods known in the rubber industry, e.g. in a (Banbury®) mixer, on a mill, in an extruder, etc., and heated to an elevated temperature, e.g. of 149° C. to 155° C., to create a masterbatch that is then cooled to room temperature. The masterbatch is then put back into the mixer, and the crosslinking agent and any blowing agent activators are added and mixed to a final batch temperature, e.g. to 82° C. to 93° C. The final batch is thereafter cooled to room temperature (25° C.) and put through an extruder, e.g. at a temperature of 63° C. to 93° C. The extruded material is placed in a hot air oven and pre-cured, e.g. at 93° C. to 105° C. for 10 to 20 minutes, and then exposed to higher temperatures, such as 143° C. to 160° C., and allowed to reach full expansion.

The shaping of the claimed material can be carried out in extruders, presses, calendars, etc. Extruders are preferred due to the possibilities to easily form sheets and tubes and to directly run them continuously through a hot air oven, salt bath, etc. Preferred are hot air ovens because in the case of a salt bath, additional cleaning steps are necessary.

Technical Effects Achieved by the Invention

The present inventors have surprisingly found that the combination of a) expandable graphite, b) the at least one alkaline earth metal component, and c) the component containing silica or silicate leads to surprisingly improved flame spread resistance, fire penetration resistance and char integrity, which is believed to be a synergistic effect resulting from the combination of these three components. As can be seen from the experiments in the present application, only if each of these three components is present, were each of flame spread resistance, fire penetration resistance and char integrity at the highest level (5). If even one of these three components was absent, none of the flame spread resistance, fire penetration resistance and char integrity reached levels of more than 3. This synergism is thus highly surprising and would not have been expected based on the prior art.

Furthermore, it has been found that the combination of expandable graphite, Ultracarb (a combination of hydromagnesite and huntite) and a phosphate plasticizer results in a rapid and very stable char. This char is extremely high-heat resistant for extended lengths of time, far in excess of typical systems based on ATH (Aluminum Tri-Hydrate). In particular, it is able to withstand direct flame up to 10,000° F. for several minutes and even up to several hours.

The materials used for preparing the claimed expanded polymeric material form the basis of a compounded material that can be expanded into a light weight expanded polymeric material that exhibits extreme fire resistance while producing very little smoke. The foamed materials can range in density to as low as about 50 g/L to about 75 g/L. At these densities, a 2.5 cm thick sample of the foamed material is capable of withstanding treatment with a direct flame of 2000° C. for over 2 hours without burning through. At a thickness of 3.2 cm the same material can withstand temperatures of 5000° C. to 5500° C. generated by a direct flame from an oxyacetylene torch for over 5 minutes before first signs of burning through are observed. This extreme fire resistance, coupled with very low smoke development could not have been foreseen based on the available prior art.

The combination of expandable graphite with the at least one alkaline earth metal component (such as Ultracarb) in an expanded polymeric material containing NBR, and chloroprene (and optionally PVC and/or chlorinated PE) results in low density flexible cellular foam material.

Without wishing to be bound by theory, it is believed that the addition of a component containing silica or silicate to the expanded polymeric material results in lower flame spread and enhanced char stability, further enhancing the burn resistance of the expanded polymeric material.

Flame resistance of the expanded polymeric material may be further enhanced by the addition of chlorinated polymers, such as PVC and/or chlorinated polyethylene. It is believed that the smoke producing effect can thereby be enhanced by dilution with higher levels of chlorine. Similar effects may be achieved by the use of chloroprene rubber and chlorinated paraffin wax. Furthermore, it is believed that the density of the expanded polymeric material may be reduced by the addition of chlorinated polymers which may lead to less material substrate to be consumed by the fire and thus less smoke being generated. By the use of as many solid (at 25° C.) chlorine containing materials in the structure of the expanded polymeric material as possible, without using liquids that can volatilize and generate smoke, a low plasticizer formulation that is still processable and produces low density can be obtained.

A further advantage of the claimed material is its versatility regarding its properties due to manifold possibilities of using fillers, plasticizers, flame retardants, additives, crosslinkers, etc. in various amounts and combinations. The aforementioned ingredients show easy mixing and good dispersion in a wide range of dosage.

Another advantage of the claimed material is its versatility regarding the production equipment. It can be produced in an economic way in a continuous process, e.g. by extrusion, extrusion and co-lamination or direct co-extrusion. The material can also be laminated, molded, co-molded, overmolded etc. directly as mono- or multilayer system and thus it can be applied in unrestricted shaping onto various surfaces in automotive, transport, aeronautics, building and construction, marine and offshore, furniture, machinery engineering and many other industries, even by thermoforming or other shaping methods. The claimed material can particularly be manufactured in the form of tubes and sheets in a continuous process in various wall thicknesses and inner diameters; most suitable are wall thicknesses between 3 and 50 mm.

As can be seen from the experimental data provided below, the expanded polymeric materials of the present invention are particularly advantageous in that they exhibit improved flame spread resistance, heat and fire penetration resistance and char integrity.

It is to be understood that the present invention specifically relates to each and every combination of features and embodiments described herein, including any combination of general and/or preferred features/embodiments.

In this specification, a number of documents including patent applications and scientific literature are cited. The disclosure of these documents, while not considered relevant for the patentability of this invention, is herewith incorporated by reference in its entirety. More specifically, all referenced documents are incorporated by reference to the same extent as if each individual document was specifically and individually indicated to be incorporated by reference.

The present invention may be better understood with reference to the following examples. These examples are intended to be representative of specific embodiments of the invention, and are not intended as limiting the scope of the invention.

EXAMPLES

Materials

| Components | Name and Supplier |
|---|---|
| Acrylonitrile Butadiene Rubber | Zeon 3335 [Zeon Elastomers] |
| Polychloroprene Rubber | Bayprene 211 [Arlanxeo] |
| Huntite/Hydromagnesite Mineral Blend | Ultracarb ARM04 [LK Minerals] |
| Azodicarbonamide | Unicell D200A [Dong Jin] |
| Hydrocarbon Wax | Ceresin Wax [Koster Kuenen] |
| Stearic Acid | Stearic Acid [HB Chemical] |
| 70% Chlorinated Paraffin Wax | CP700 [Dover] |
| Kaolin Clay | ASP 600 [BASF] |
| Polyvinylchloride | Shintec SE-450-A [Shintec] |
| Chlorinated Polyethylene | Weipren 6335 CPE [Lianda Corporation] |
| Expandable Graphite | Grafguard 200-100N [NeoGraf Solutions] |
| Polyethylene Glycol | PEG 4000 [HB Chemical] |
| Tributoxy Ethyl Phosphate | TBEP [HB Chemical] |

Method of Preparation (1) All materials except for the crosslinking agent were mixed in a (Banbury®) mixer and heated to 149° C. to 155° C., to create a masterbatch that was then cooled to room temperature.

(2) The masterbatch was then put back into the mixer and the crosslinking agent and any blowing agent activators were added and mixed to create a final batch having a temperature of 82° C. to 93° C.

(3) The final batch was cooled to room temperature (25° C.) and passed through an extruder at a temperature of 63° C. to 93° C.

(4) The extruded material was placed in a hot air oven and pre-cured at 93° C. to 105° C. for 10 to 20 minutes, and then exposed to a temperature of 143° C. to 160° C., and allowed to reach full expansion.

Components

| | Composition | | | | |
|---|---|---|---|---|---|
| Components/parts | (A) | (B) | (C) | (D) | (E) |
| Acrylonitrile Butadiene Rubber | 65.0 | 65.0 | 65.0 | 65.0 | 65.0 |
| Polychloroprene Rubber | 35.0 | 35.0 | 35.0 | 35.0 | 35.0 |

-continued

| | Composition | | | | |
|---|---|---|---|---|---|
| Components/parts | (A) | (B) | (C) | (D) | (E) |
| Huntite/Hydromagnesite Mineral Blend | 300.0 | — | 300.0 | — | 300.0 |
| Calcium Carbonate | — | — | — | 300.0 | — |
| Azodicarbonamide | 70.0 | 70.0 | 70.0 | 70.0 | 70.0 |
| Hydrocarbon Wax | 10.0 | 10.0 | 10.0 | 10.0 | 10.0 |
| Stearic Acid | 1.5 | 1.5 | 1.5 | 1.5 | 1.5 |
| 70% Chlorinated Paraffin Wax | 80.0 | 80.0 | 80.0 | 80.0 | 80.0 |
| Kaolin Clay | 50.0 | 50.0 | 50.0 | 50.0 | — |
| Polyvinylchloride | 40.0 | 40.0 | 40.0 | 40.0 | 40.0 |
| Chlorinated Polyethylene | 25.0 | 25.0 | 25.0 | 25.0 | 25.0 |
| Expandable Graphite | — | 30.0 | 30.0 | 30.0 | 30.0 |
| Polyethylene Glycol | 4.0 | 4.0 | 4.0 | 4.0 | 4.0 |
| Tributoxy Ethyl Phosphate | 20.0 | 20.0 | 20.0 | 20.0 | 20.0 |
| Total Masterbatch PHR | 700.5 | 430.5 | 730.5 | 730.5 | 680.5 |
| Zinc Oxide 85% Active | 2.5 | 2.5 | 2.5 | 2.5 | 2.5 |
| Sulfur 80% Active | 4 | 4 | 4 | 4 | 4 |
| ZDMC 75% Active | 4.5 | 4.5 | 4.5 | 4.5 | 4.5 |
| DPTT 70% Active | 3 | 3 | 3 | 3 | 3 |
| Zinc Sulfate 70% Active | 2 | 2 | 2 | 2 | 2 |
| Total Formula PHR | 716.5 | 446.5 | 746.5 | 746.5 | 696.5 |

Fire Rating Results

Figure 2:
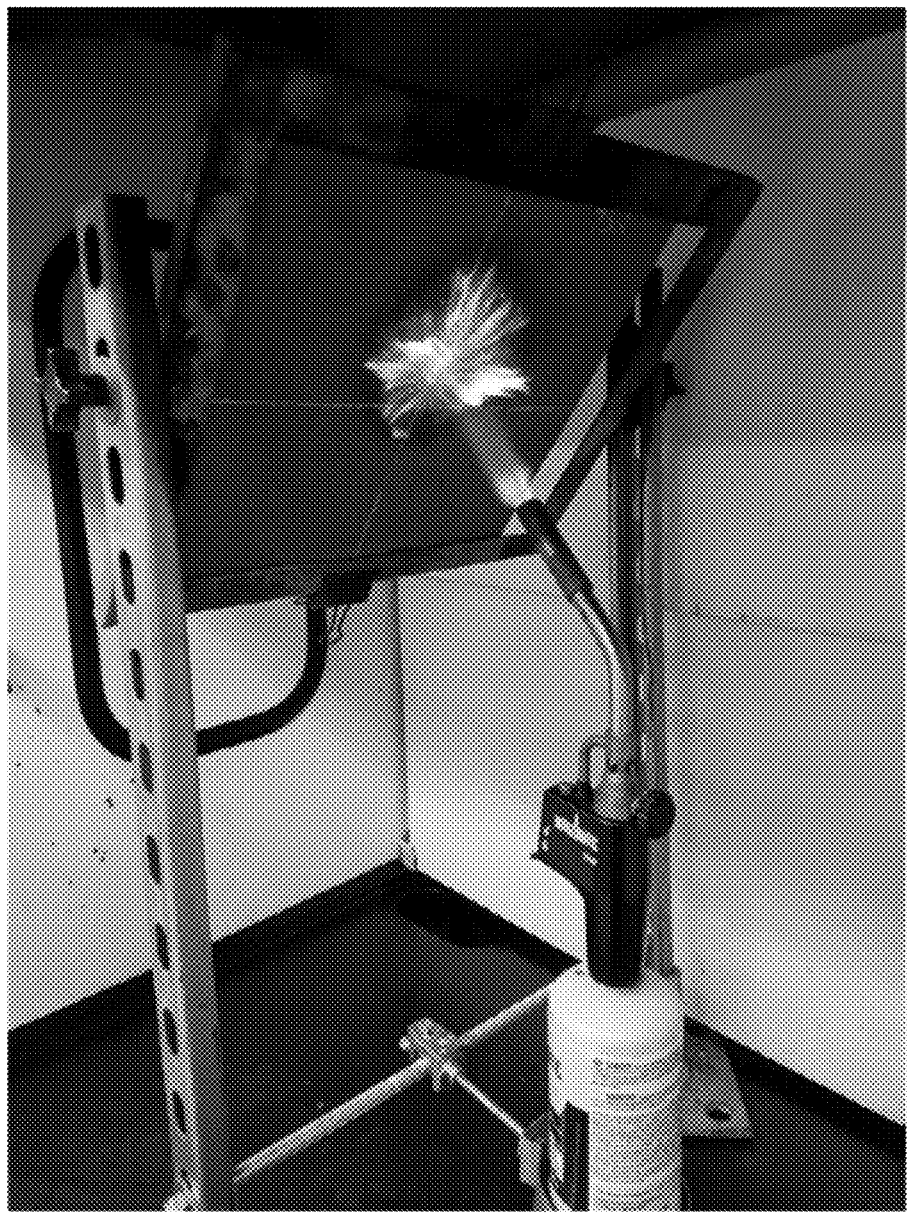
FIG. 2 is a photograph illustrating the MAPP gas blowtorch test at a distance of 10 cm at a temperature of 2000° C., as described below in the Examples section of the present application.

Flame spread resistance, fire penetration resistance and char integrity were evaluated for five example foams, i.e. Examples (A) to (E). Each of the expanded polymeric material of Examples (B) to (E) was heated with a MAPP (Methyl Acetylene Propadiene Propane) blowtorch from a distance of 10 cm with a fully open flow valve so as to achieve a surface temperature of 2000° C. for 10 minutes, as illustrated in FIG. 2. Example (A) was treated in the same way, but only for a duration of 3 minutes. The results are shown in the following table as well as in FIGS. 1A to 1E.

| Formula Composition | Flame Spread Resistance | Fire Penetration Resistance | Char Integrity |
|---|---|---|---|
| (A) No Graphite with Preferred Mineral Blend and Clay | 3 | 0 | 0 |
| (B) Graphite with only Clay | 0 | 3 | 3 |
| (C) Graphite with Preferred Mineral Blend and Clay | 5 | 5 | 5 |
| (D) Graphite with Calcium Carbonate and Clay | 3 | 2 | 1.5 |
| (E) Graphite with Preferred Mineral Blend Only | 2 | 4 | 2 |

Flame Spread Resistance: 0=Poor Flame Resistance to 5=Superior Flame Resistance

Fire Penetration Resistance: 0=Poor Resistance to 5=Superior Resistance

Char Integrity: 0=Poor Char Stability to 5=Superior Char Stability

As can be seen from these experiments, only if each of the above-mentioned three required components were present (as in Example (C)), were each of flame spread resistance, fire penetration resistance and char integrity at the highest level (5). If even one of these three components was absent, none of the flame spread resistance, fire penetration resistance and char integrity reached levels of more than 4. This synergism is thus highly surprising and would not have been expected based on the prior art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An expanded polymeric material comprising:
   100 phr rubber, wherein at least 80% of the rubber comprises acrylonitrile butadiene rubber (NBR), chloroprene rubber (CR), ethylene propylene diene monomer rubber (EPDM), butadiene rubber (BR), chlorosulfonated polyethylene rubber (CSM), and/or combinations thereof,
   expandable graphite in an amount of 5 to 200 phr,
   a compound or mixture of compounds containing at least one alkaline earth metal ion, at least one hydrogen carbonate or carbonate ion, and at least one hydroxyl group or water molecule in a total amount of 50 to 500 phr, and
   a component containing silica or silicate in an amount of 5 to 200 phr;
   wherein a total mass of the expanded polymeric material is at least 300 phr and less than 1200 phr.

2. The expanded polymeric material according to claim 1, wherein the total mass of the expanded polymeric material is at least 400 phr.

3. The expanded polymeric material according to claim 1 or 2, wherein the total mass of the expanded polymeric material is 1100 phr or less.

4. The expanded polymeric material according to any one of claims 1 to 3, wherein the total mass of the expanded polymeric material is 400 phr or more and 1100 phr or less.

5. The expanded polymeric material according to any one of claims 1 to 4, wherein the expandable graphite has a temperature of activation in a range of 180° C. to 300° C.

6. The expanded polymeric material according to any one of claims 1 to 4 or 5, wherein the expandable graphite has a mean particle size, in terms of $D_{50}$, of 20 μm or more to 1410 μm or less.

7. The expanded polymeric material according to any one of claims 1 to 5 or 6, wherein the expandable graphite has an expansion volume at 600° C. in a range of 25 $cm^3$/gram to 450 $cm^3$/gram.

8. The expanded polymeric material according to any one of claims 1 to 4 or 5 to 7, wherein the compound or mixture of compounds containing at least one alkaline earth metal ion, at least one hydrogen carbonate or carbonate ion, and at least one hydroxyl group or water molecule contains more than 60 wt.-% of a total of hydrated magnesium carbonate and magnesium calcium carbonate.

9. The expanded polymeric material according to any one of claims 1 to 4 or 5 to 8, wherein the compound or mixture of compounds containing at least one alkaline earth metal ion, at least one hydrogen carbonate or carbonate ion, and at least one hydroxyl group or water molecule comprises a mixture of 60 wt.-% hydrated magnesium carbonate and 40 wt.-% magnesium calcium carbonate to 40 wt.-% hydrated magnesium carbonate and 60 wt.-% magnesium calcium carbonate, based on the total amount of the at least one alkaline earth metal component.

10. The expanded polymeric material according to any one of claims 1 to 4 or 5 to 9, wherein the compound or mixture of compounds containing at least one alkaline earth metal ion, at least one hydrogen carbonate or carbonate ion, and at least one hydroxyl group or water molecule comprises, expressed in terms of oxides, MgO: 25% to 50 wt.-% and CaO: 2% to 15 wt.-%.

11. The expanded polymeric material according to any one of claims 1 to 4 or 5 to 10, wherein the compound or mixture of compounds containing at least one alkaline earth metal ion, at least one hydrogen carbonate or carbonate ion, and at least one hydroxyl group or water molecule comprises, expressed in terms of oxides, MgO: 36% to 39 wt.-% and CaO: 6% to 9 wt.-%.

12. The expanded polymeric material according to any one of claims 1 to 4 or 5 to 11, wherein the compound or mixture of compounds containing at least one alkaline earth metal ion, at least one hydrogen carbonate or carbonate ion, and at least one hydroxyl group or water molecule exhibits a loss on ignition at 1,000° C. of 45 to 60 wt.-%.

13. The expanded polymeric material according to any one of claims 1 to 4 or 5 to 12, wherein the component containing silica or silicate is selected from phyllosilicates and tectosilicates.

14. The expanded polymeric material according to any one of claims 1 to 4 or 5 to 12, wherein the component containing silica or silicate is selected from silica, fly ash, feldspar, diatomaceous earth, mica, vermiculite, clay, zeolite, talc, kaolin, palygorskite, cheto, hectorite, montmorillonite, barasym, ripidolite, smectite, Illite, nontronite, corrensite, saponite, sepiolite and beidellite.

15. The expanded polymeric material according to any one of claims 1 to 4 or 5 to 14, wherein the component containing silica or silicate is clay.

16. The expanded polymeric material according to claim 15, wherein the clay comprises kaolin clay.

17. The expanded polymeric material according to any one of claims 1 to 4 or 5 to 16, wherein the rubber is selected from natural rubber (NR), acrylonitrile butadiene rubber (NBR), chloroprene rubber (CR), ethylene propylene diene monomer rubber (EPDM), butadiene rubber (BR), chlorosulfonated polyethylene rubber (CSM), Silicone Rubber (MQ) or any combination thereof.

18. The expanded polymeric material according to any one of claims 1 to 4 or 5 to 17, wherein the 100 phr of rubber comprises 10 to 95 phr of acrylonitrile butadiene rubber, 0 to 60 phr chloroprene rubber and 5 to 20 phr of other rubbers.

19. The expanded polymeric material according to any one of claims 1 to 4 or 5 to 18, wherein the rubber comprises acrylonitrile butadiene rubber and/or polychloroprene rubber.

20. The expanded polymeric material according to any one of claims 1 to 4 or 5 to 19, further comprising polyvinylchloride in an amount of 5 to 120 phr.

21. The expanded polymeric material according to any one of claims 1 to 4 or 5 to 20, further comprising chlorinated polyethylene in an amount of 5 to 120 phr.

22. The expanded polymeric material according to any one of claims 1 to 4 or 5 to 21, further comprising chlorinated paraffin wax in an amount of 5 to 120 phr.

23. The expanded polymeric material according to any one of claims 1 to 4 or 5 to 22, further comprising at least one phosphate plasticizer in a total amount of 5 to 100 phr.

24. The expanded polymeric material according to any one of claims 1 to 4 or 5 to 23, further comprising hydrocarbon wax in an amount of 1 to 50 phr.

25. A process for manufacturing the expanded polymeric material according to any of claims 1 to 4 or 5 to 24, the process comprising expanding a polymeric material by decomposition of a chemical blowing agent.

26. A thermal insulation, acoustic insulation, or fire barrier comprising the expanded polymeric material according to any of claims 1 to 4 or 5 to 24.

* * * * *